(12) United States Patent
Shibutani

(10) Patent No.: US 9,419,724 B2
(45) Date of Patent: Aug. 16, 2016

(54) COHERENT OPTICAL RECEIVER AND OPTICAL RECEIVING METHOD

(71) Applicant: Makoto Shibutani, Tokyo (JP)

(72) Inventor: Makoto Shibutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 13/846,020

(22) Filed: Mar. 18, 2013

(65) Prior Publication Data

US 2014/0270809 A1    Sep. 18, 2014

(30) Foreign Application Priority Data

Mar. 22, 2012  (JP) ................................. 2012-064954

(51) Int. Cl.
*H04B 10/06* (2006.01)
*H04B 10/61* (2013.01)

(52) U.S. Cl.
CPC ............ *H04B 10/616* (2013.01); *H04B 10/611* (2013.01)

(58) Field of Classification Search
CPC .... H04B 10/60; H04B 10/611; H04B 10/616; H04B 10/6971; H04B 10/6161; H04B 10/25073; H04B 10/613; H04B 10/6163; H04B 10/64; H04B 10/61; H04B 10/63; H04B 10/615
USPC .................. 398/208–211, 202–204
See application file for complete search history.

(56) References Cited

U.S. PATENT DOCUMENTS

| | | | | |
|---|---|---|---|---|
| 4,989,201 A * | 1/1991 | Glance | ............................ | 398/95 |
| 5,023,946 A * | 6/1991 | Yamazaki et al. | ............ | 398/204 |
| 5,144,467 A * | 9/1992 | Kitajima et al. | ................ | 398/95 |
| 6,434,294 B1 * | 8/2002 | Gallo | .............................. | 385/27 |
| 7,024,172 B1 * | 4/2006 | Murphy et al. | ................ | 455/324 |
| 7,356,256 B1 * | 4/2008 | Strawczynski et al. | ......... | 398/33 |
| 7,583,896 B2 * | 9/2009 | Taniguchi et al. | .............. | 398/72 |
| 7,826,752 B1 * | 11/2010 | Zanoni et al. | ................. | 398/205 |
| 8,306,431 B2 * | 11/2012 | Takahara | ...................... | 398/152 |
| 8,391,725 B2 * | 3/2013 | Oda et al. | ...................... | 398/204 |
| 8,660,438 B2 * | 2/2014 | Nakashima et al. | .......... | 398/208 |
| 8,989,603 B2 * | 3/2015 | Shibutani | ...................... | 398/208 |
| 2003/0072060 A1 * | 4/2003 | Sourani | ......................... | 359/172 |
| 2007/0154221 A1 * | 7/2007 | McNicol et al. | .............. | 398/135 |
| 2009/0080906 A1 * | 3/2009 | Tao et al. | ....................... | 398/209 |
| 2009/0129787 A1 * | 5/2009 | Li et al. | ......................... | 398/208 |
| 2009/0142076 A1 * | 6/2009 | Li et al. | ......................... | 398/208 |
| 2012/0237211 A1 * | 9/2012 | Iizuka et al. | .................... | 398/26 |
| 2013/0216232 A1 * | 8/2013 | Zanoni et al. | .................... | 398/79 |
| 2014/0286637 A1 * | 9/2014 | Kikuchi | ......................... | 398/48 |

FOREIGN PATENT DOCUMENTS

JP       7-283793 A     10/1995
JP    2008-153863 A      7/2008

* cited by examiner

*Primary Examiner* — Hibret Woldekidan
(74) *Attorney, Agent, or Firm* — Sughrue Mion, PLLC

(57) ABSTRACT

A coherent optical receiver according to an exemplary aspect of the invention includes a coherent optical receiving part performing coherent detection by inputting and mixing local oscillation light and main signal light received through a transmission line with a signal applied at a transmitting side, outputting the signal applied to the main signal light as an electric signal, and regenerating and outputting an original signal on the basis of the electric signal; and a local oscillation optical frequency control part receiving channel information on a transmission line adjacent to the main signal light, and outputting the local oscillation light after changing a frequency of the local oscillation light depending on the presence or absence of adjacent channel signal light of other signal light in an adjacent channel.

4 Claims, 9 Drawing Sheets

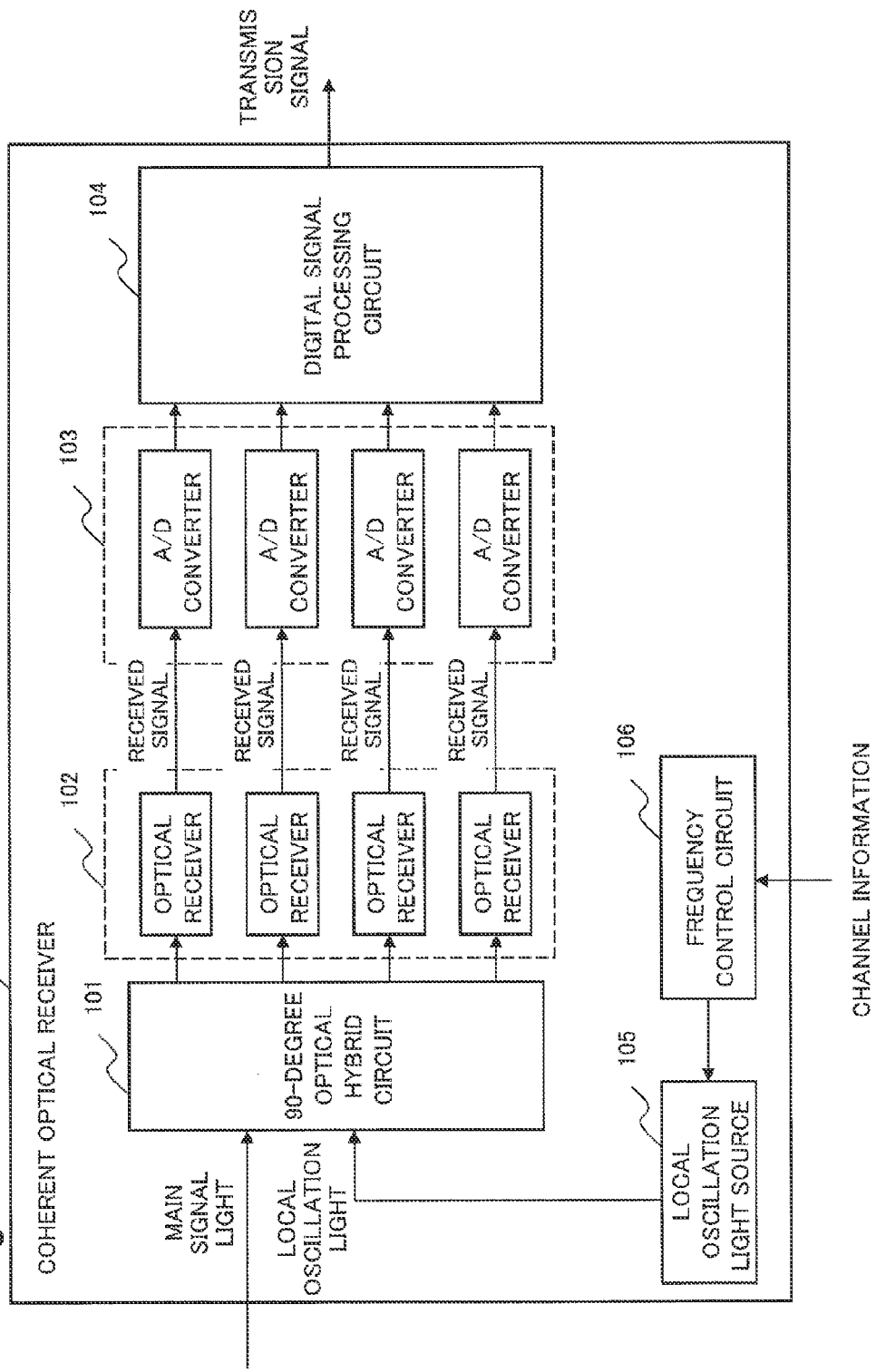

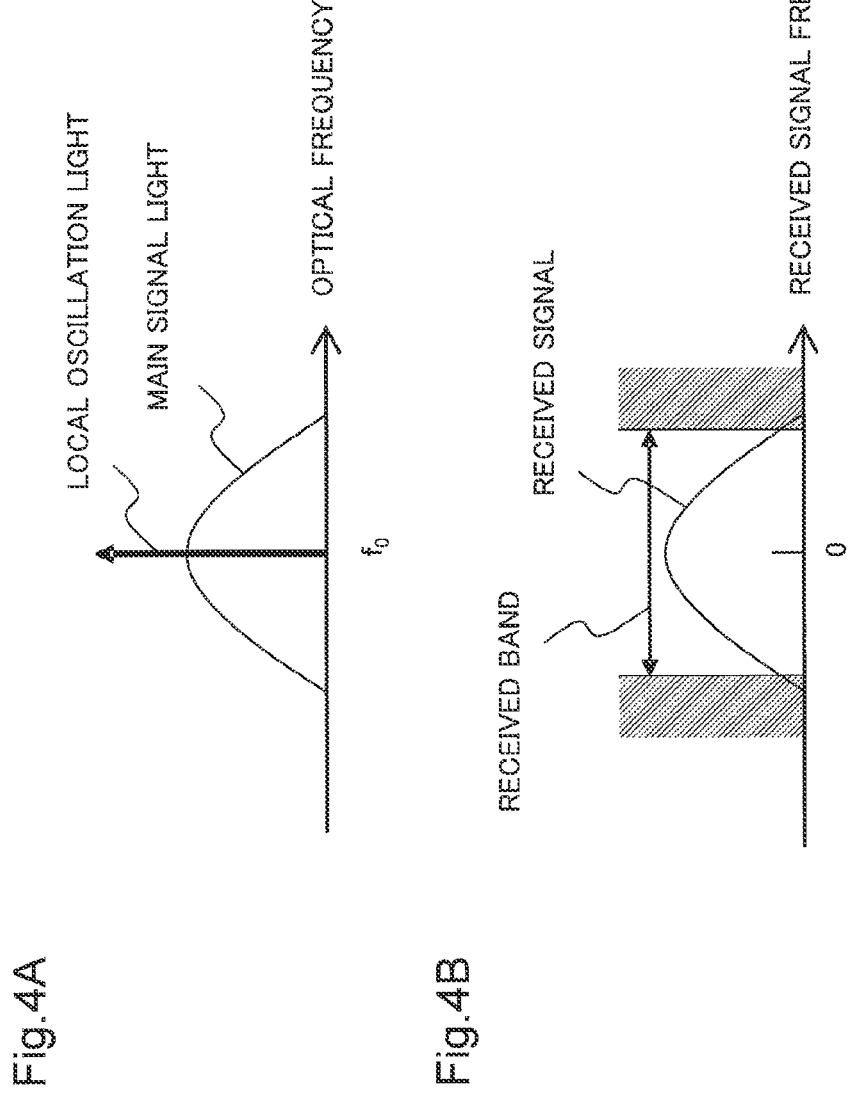

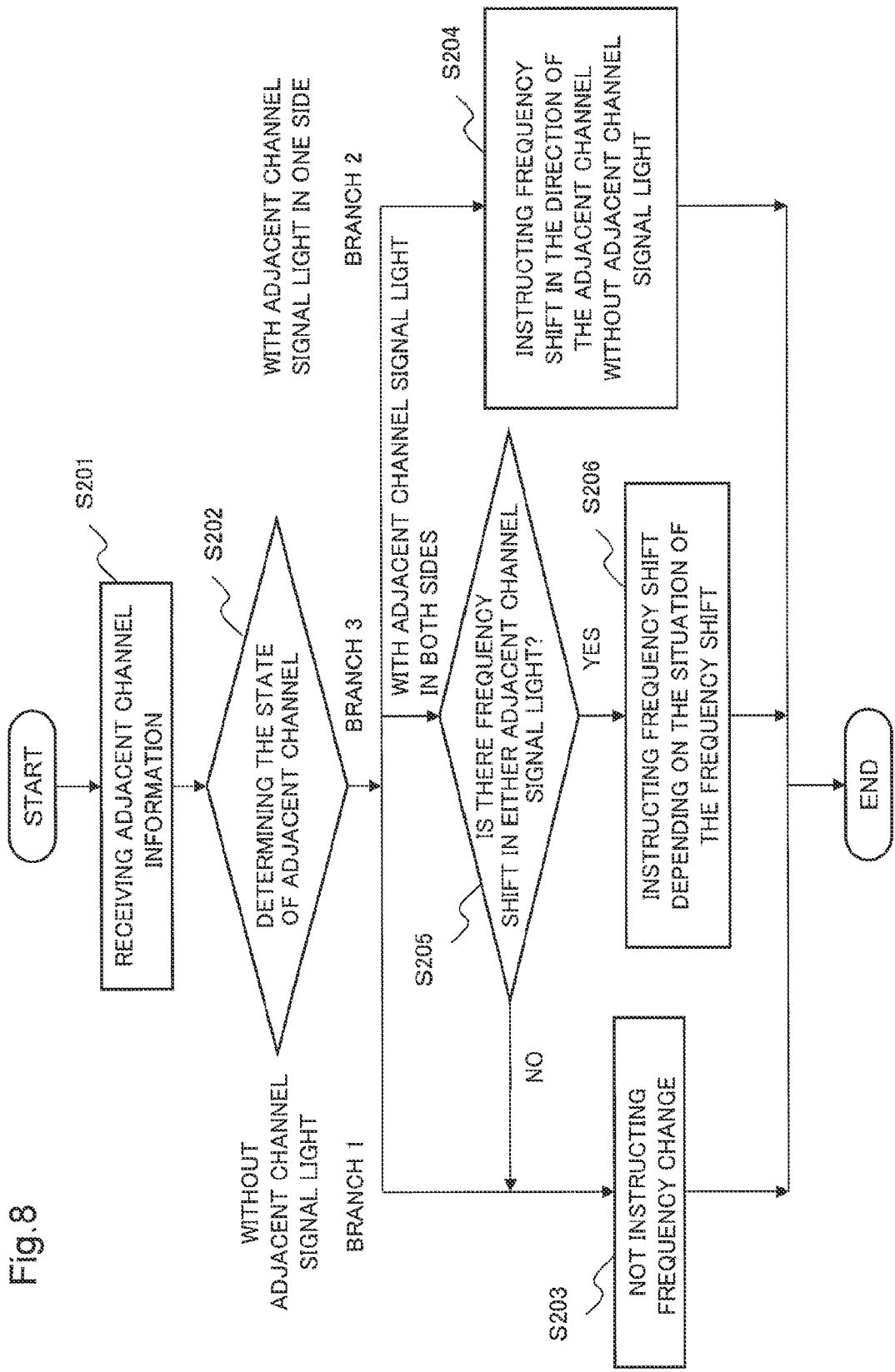

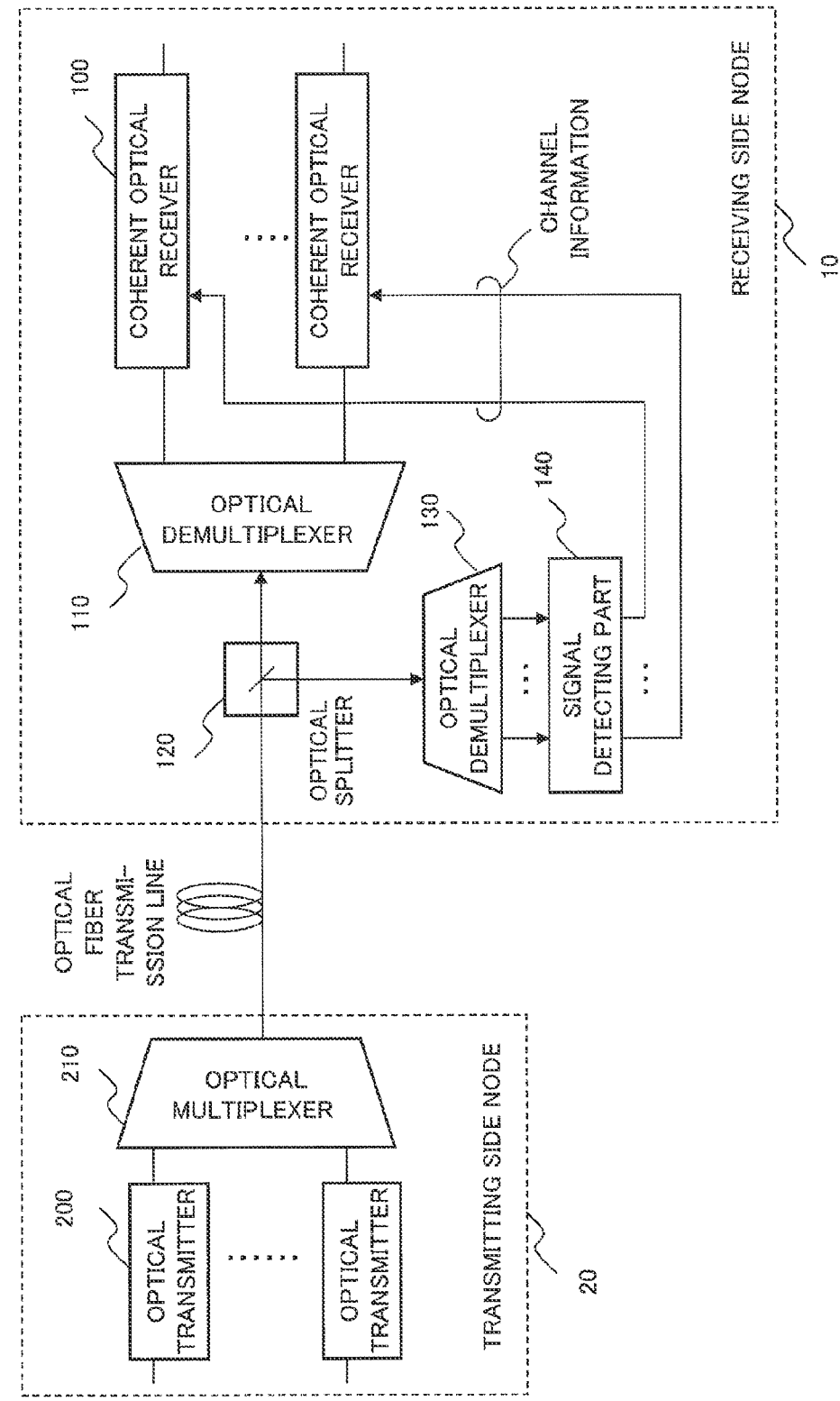

COHERENT OPTICAL RECEIVER AND OPTICAL RECEIVING METHOD

This application is based upon and claims the benefit of priority from Japanese Patent Application No. 2012-064954, filed on Mar. 22, 2012, the disclosure of which is incorporated herein in its entirety by reference.

TECHNICAL FIELD

The present invention relates to coherent optical receivers and optical receiving methods using a coherent optical receiving system, in particular, to a coherent optical receiver and an optical receiving method which reduce crosstalk from adjacent channels.

BACKGROUND ART

A digital coherent optical receiving system is a technology of performing coherent optical reception of signal light which is transmitted with a signal being applied to the amplitude or phase of an optical electric-field at a transmitting side, converting an optical signal obtained by performing the coherent optical reception into an electric signal, and regenerating an original signal by performing digital signal processing on the electric signal. In the digital coherent optical receiving system, it can be realized with a high degree of accuracy by the digital signal processing to perform waveform equalization processing such as chromatic dispersion compensation or the like, which becomes a large problem at the time of long-haul transmission by an optical fiber system.

The coherent optical reception includes the steps of mixing the inputted signal light with local light (local oscillation light) which has almost the same frequency as the signal light by inputting them into a 90-degree optical hybrid circuit, and obtaining as an output an interference light with down-converted frequency which is generated by the mixing. The output from the 90-degree optical hybrid circuit includes a set of two lights (in-phase component and quadrature component) whose phases differ from each other with 90 degrees, which are photoelectrically converted in a photoelectric conversion circuit and outputted as an electric signal which represents an electric field envelope of the signal light. This electric signal is converted into a digital signal, on which the waveform equalization processing is performed by the digital signal processing.

Examples of such a coherent optical receiver are disclosed in Japanese Patent Application Laid-Open Publication No. 2008-153863 and Japanese Patent Application Laid-Open Publication No. 07-283793.

Japanese Patent Application Laid-Open Publication No. 2008-153863 discloses a technology relating to an optical receiver of the coherent reception system that can receive signal light of high bit rate independent of a polarization state of the signal light. According to the technology disclosed by Japanese Patent Application Laid-Open Publication No. 2008-153863, the local oscillation light having orthogonal polarization components whose optical frequencies differ from each other is mixed with the received signal light, and then the mixed wave signal is converted into an electric signal in a photoelectric conversion unit. As a result, each intermediate frequency signal arises which is generated by a beat of each orthogonal polarization component and a received optical signal. The difference of the optical frequency between these orthogonal polarization components is set so as to be smaller than twice the bandwidth of the received signal light and not to become larger than a spectral line width of a light source generating the received signal light and a spectral line width of a light source generating the local oscillation light. Therefore, each electric spectrum of the intermediate frequency signal becomes overlapped, and it is possible to narrow the bandwidth required in an electronic circuit used in the subsequent stage to about twice the bandwidth of the signal.

Japanese Patent Application Laid-Open Publication No. 07-283793 discloses a technology for solving a problem that a bit rate of signal light cannot be increased to the same extent as the band of a light receiving element, and performing the coherent optical reception of an optical signal modulated by means of the optical FSK (frequency shift keying) modulation system as a narrowband signal. According to the technology disclosed in Japanese Patent Application Laid-Open Publication No. 07-283793, an optical phase locked loop is formed which controls the optical phase of a local oscillation optical signal by a phase error signal, and the optical frequency of a local oscillation light source is kept situated between the frequency corresponding to a mark code and the frequency corresponding to a space code of the optical FSK signal. And, a bit judgment circuit determines whether the phase of the optical FSK signal is advanced or delayed compared with the local oscillation optical signal and determines a mark and a space of the received signal.

SUMMARY

An exemplary object of the invention is to provide a coherent optical receiver and an optical receiving method which reduce crosstalk from adjacent channels.

A coherent optical receiver according to an exemplary aspect of the invention includes a coherent optical receiving part performing coherent detection by inputting and mixing local oscillation light and main signal light received through a transmission line with a signal applied at a transmitting side, outputting the signal applied to the main signal light as an electric signal, and regenerating and outputting an original signal on the basis of the electric signal; and a local oscillation optical frequency control part receiving channel information on a transmission line adjacent to the main signal light, and outputting the local oscillation light after changing a frequency of the local oscillation light depending on the presence or absence of adjacent channel signal light of other signal light in an adjacent channel.

An optical receiving method according to an exemplary aspect of the invention includes the steps of receiving main signal light with a signal applied at a transmitting side through a transmission line; receiving channel information on a transmission line adjacent to the main signal light; outputting local oscillation light after changing a frequency of the local oscillation light depending on the presence or absence of adjacent channel signal light of other signal light in an adjacent channel; performing coherent detection by mixing the main signal light with the local oscillation light and outputting the signal applied to the main signal light as an electric signal; and regenerating and outputting an original signal on the basis of the electric signal.

BRIEF DESCRIPTION OF THE DRAWINGS

Exemplary features and advantages of the present invention will become apparent from the following detailed description when taken with the accompanying drawings in which:

FIG. 3 is a block diagram showing a configuration of a coherent optical receiver in accordance with the second exemplary embodiment of the present invention;

FIG. 4A is a figure showing the location of the local oscillation light without adjacent channel signal light;

FIG. 4B is a figure showing the frequency spectrum of a received signal without adjacent channel signal light;

FIG. 8 is a flowchart illustrating the operation of a frequency control circuit of the coherent optical receiver in accordance with the second exemplary embodiment of the present invention; and FIG. 9 is a block diagram showing an example of a configuration for providing channel information from the outside for the frequency control circuit of the coherent optical receiver.

EXEMPLARY EMBODIMENT

Next, exemplary embodiments of the present invention will be described in detail with reference to drawings.

In optical receivers using the coherent optical receiving system, the coherent optical receiver according to the exemplary embodiments of the present invention reduces crosstalk from adjacent channels by changing a frequency of the local oscillation light depending on the states of the adjacent channel signal light.

Figure 1:
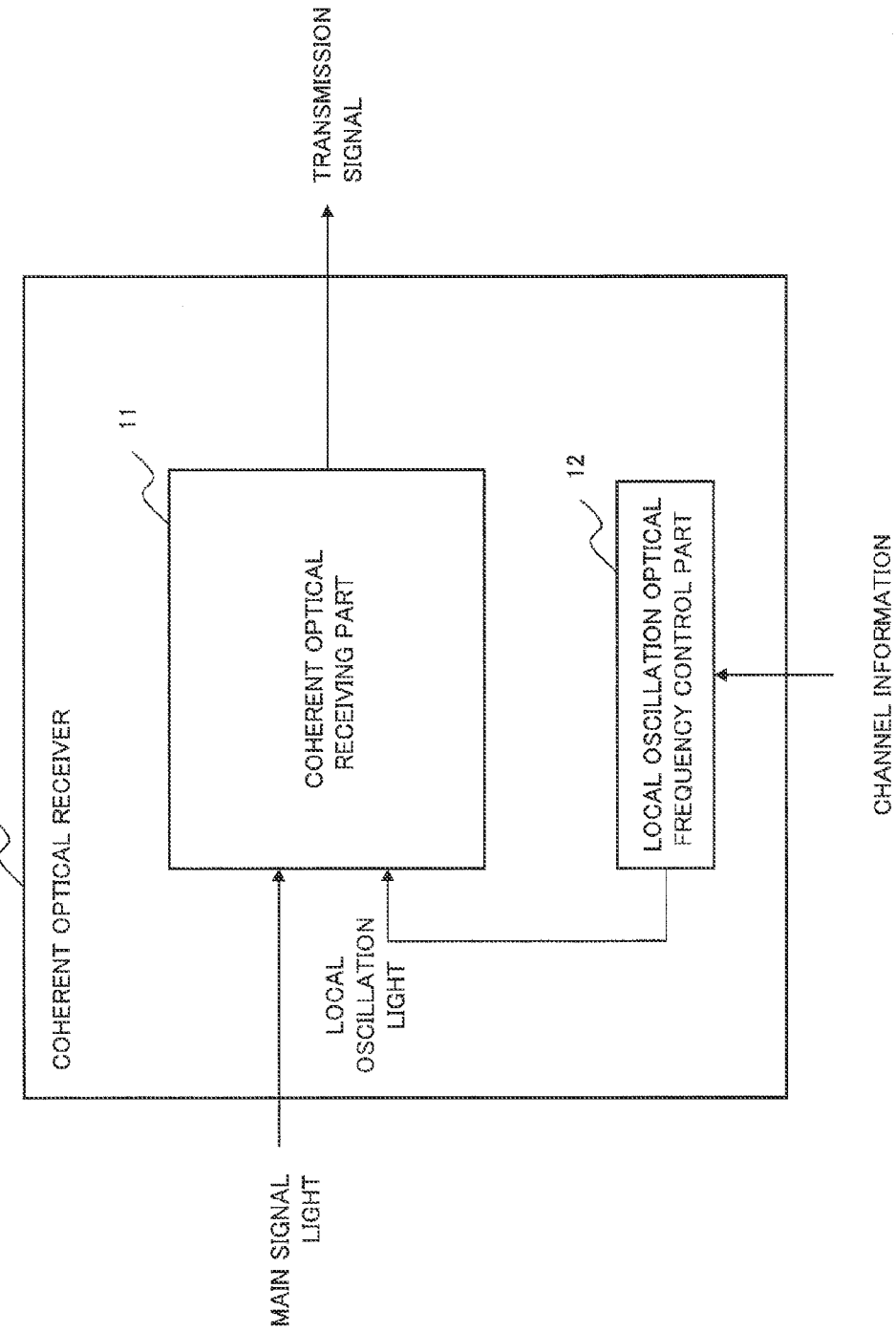
FIG. 1 is a block diagram showing a configuration of a coherent optical receiver in accordance with the first exemplary embodiment of the present invention.

FIG. 1 is a block diagram showing a configuration of the coherent optical receiver in accordance with the first exemplary embodiment.

The coherent optical receiver 1 of the first exemplary embodiment includes a coherent optical receiving part 11 and a local oscillation optical frequency control part 12.

The coherent optical receiving part 11 inputs local oscillation light and signal light with a signal applied at a transmitting side and received through a transmission line, and performs coherent detection by mixing them. As a result, it outputs the signal applied in the main signal light as an electric signal, and regenerates and outputs an original signal based on the electric signal. The signal light inputted into the coherent optical receiving part 11 is named main signal light. The local oscillation optical frequency control part 12 receives channel information on a transmission line adjacent to the main signal light, and outputs the local oscillation light after changing a frequency of the local oscillation light depending on the presence or absence of adjacent channel signal light of other signal light in an adjacent channel.

Figure 2:
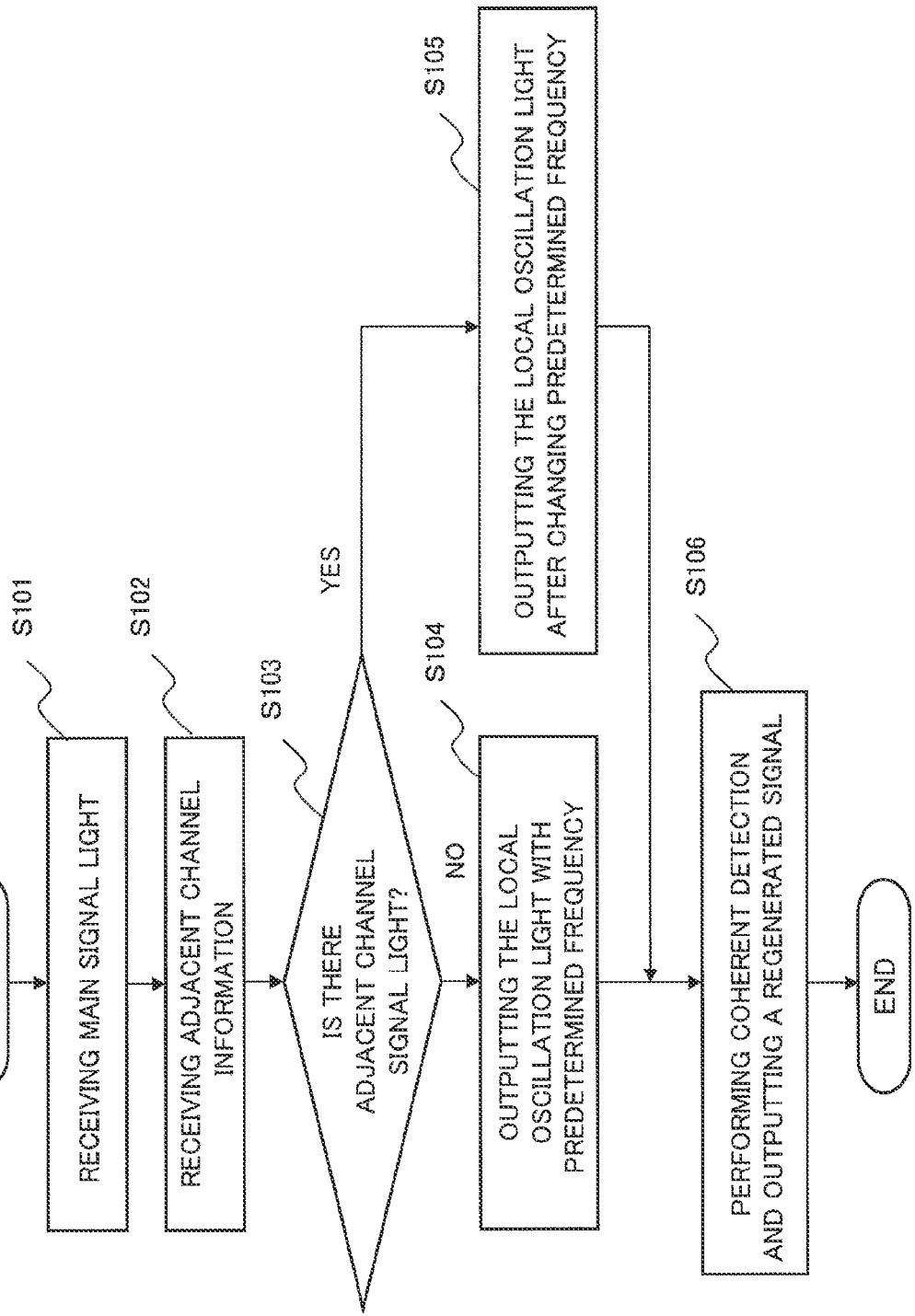
FIG. 2 is a flowchart illustrating the operation of an optical receiving method in accordance with the first exemplary embodiment of the present invention.

FIG. 2 is a flowchart illustrating the operation of an optical receiving method in accordance with the first exemplary embodiment.

First, main signal light with a signal applied at a transmitting side is received through a transmission line (S101). At that time, channel information on a transmission line adjacent to the main signal light is received (S102). And, local oscillation light is outputted after changing a frequency of the local oscillation light depending on the presence or absence of adjacent channel signal light of other signal light in an adjacent channel (S103).

That is to say, if there is not adjacent channel signal light (S103/NO), the local oscillation light is outputted whose frequency is predetermined corresponding to the main signal light (S104). On the other hand, if there is adjacent channel signal light (S103/YES), the local oscillation light is outputted after having changed the frequency which is predetermined corresponding to the main signal light (S105).

Next, coherent detection is performed by mixing the main signal light and the local oscillation light outputted in S104 or S105, the signal applied in the main signal light is outputted as an electric signal, and an original signal is regenerated and outputted based on the electric signal (S106).

Thus, according to the first exemplary embodiment, the frequency of the local oscillation light is changed depending on the presence or absence of the adjacent channel signal light. Accordingly, it is possible to reduce adjacent channel crosstalk by shifting the band of the main signal channel to the area into which the signal band of the adjacent channel does not get mixed.

Next, the second exemplary embodiment will be described.

FIG. 3 is a block diagram showing a configuration of a coherent optical receiver in accordance with the second exemplary embodiment.

The coherent optical receiver 100 of the second exemplary embodiment includes a 90-degree optical hybrid circuit 101, an optical receiver 102, an A/D (analog to digital) converter 103, a digital signal processing circuit 104, a local oscillation light source 105, and a frequency control circuit 106.

Main signal light with a signal applied at a transmitting side which is inputted into the coherent optical receiver 100 is mixed with local oscillation light outputted from the local oscillation light source 105 in the 90-degree optical hybrid circuit 101. An in-phase component and a quadrature component of the interfering light generated by the mixing are outputted from four output ports of the 90-degree optical hybrid circuit 101 for each polarization.

This interfering light is photoelectrically converted in the optical receiver 102, and an analog received signal is outputted. This received signal is converted into a digital signal in the A/D converter 103 and is inputted into the digital signal processing circuit 104. On the digital signal inputted into the digital signal processing circuit 104, the processing such as dispersion compensation, polarization demultiplexing, carrier frequency offset compensation, carrier phase compensation, and signal decision is performed, and a demodulated transmission signal is outputted.

On the other hand, channel information is given to the coherent optical receiver 100 from the outside, and on the basis of this, the frequency control circuit 106 performs frequency offset control that it shifts a frequency of the local oscillation light outputted from the local oscillation light source 105.

Hereinafter, the operation of the coherent optical receiver 100 according to the second exemplary embodiment will be described with reference to FIGS. 4 to 7.

FIG. 4A is a figure showing the location of the local oscillation light without adjacent channel signal light. FIG. 4B is a figure showing the frequency spectrum of a received signal without adjacent channel signal light.

Figure 5A:
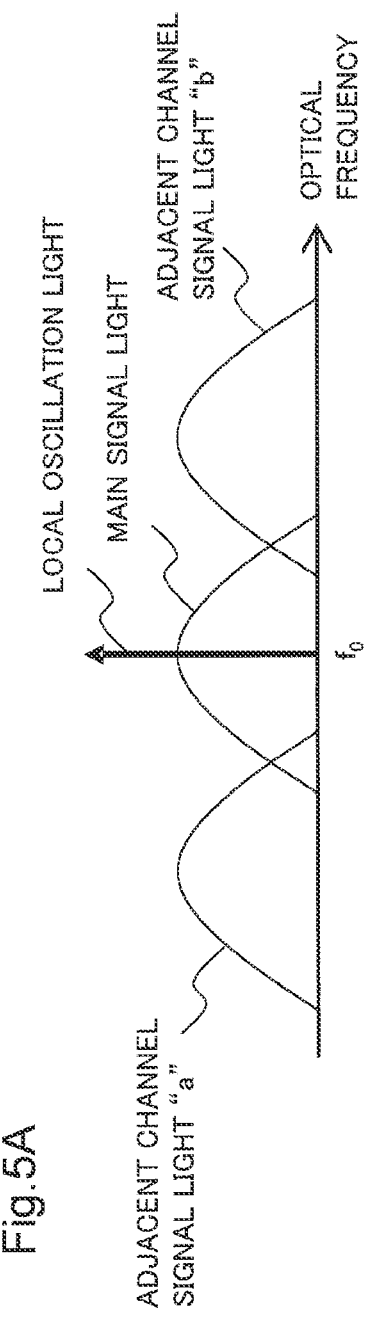
FIG. 5A is a figure showing the location of the local oscillation light with adjacent channel signal light in both sides of the main signal light.
Figure 5B:
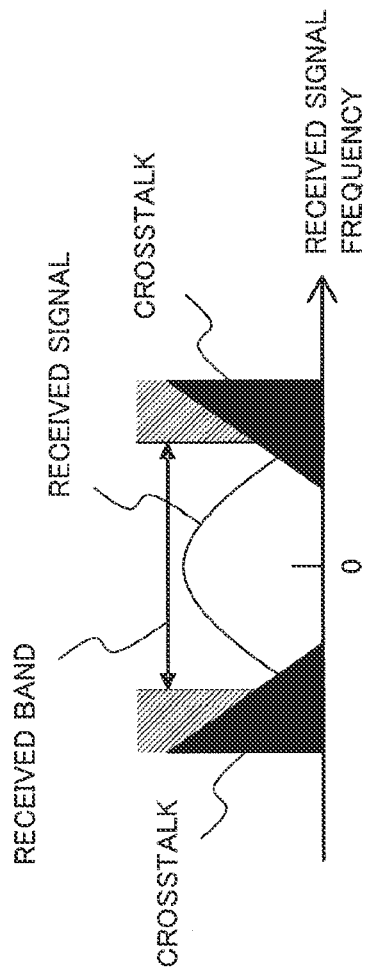
FIG. 5B is a figure showing the frequency spectrum of a received signal with adjacent channel signal light in both sides of the main signal light.

FIG. 5A is a figure showing the location of the local oscillation light to the main signal light with adjacent channel signal light (the adjacent channel signal light "a" and the adjacent channel signal light "b") in both sides of the main signal light. FIG. 5B is a figure showing the frequency spectrum of a received signal with adjacent channel signal light in both sides of the main signal light. In FIG. 5B, the crosstalk due to an adjacent channel signal is represented by the triangles (black) in both sides of a received band of the main signal. The crosstalk due to an adjacent channel signal is similarly shown in FIGS. 6A, 6B and FIGS. 7A, 7B.

As shown in FIG. 4A, if there is no adjacent channel signal light in the adjacent channel of the main signal light to be received, the frequency of the local oscillation light is set at the center of the frequency grid $f_0$. Similarly, as shown in FIG. 5A, if there is the adjacent channel signal light in the adjacent channels in both sides of the main signal light to be received, the frequency of the local oscillation light is also set at the center of the frequency grid $f_0$.

In other words, the frequency control circuit 106 does not change the frequency of the local oscillation light if the channel information given from the outside indicates that there is no adjacent channel signal light in the adjacent channel of the main signal light to be received, or there is the adjacent channel signal light in the adjacent channels in both sides. Not to change the frequency of the local oscillation light means that the frequency of the local oscillation light outputted from the local oscillation light source 105 remains the same as a frequency prescribed corresponding to the main signal light received by the coherent optical receiver 100.

In this case, the frequency spectrum of a received signal becomes symmetrical centering on frequency zero, and signal processing is performed in the digital signal processing circuit 104 on the only spectral component entering the received band of the main signal which is received by the coherent optical receiver 100, and a transmission signal is demodulated. The received band of the coherent optical receiver 100 is determined by a band of the optical receiver 102, a band of the A/D converter 103, or a band of the filter part installed in the digital signal processing circuit 104.

Figure 6A:
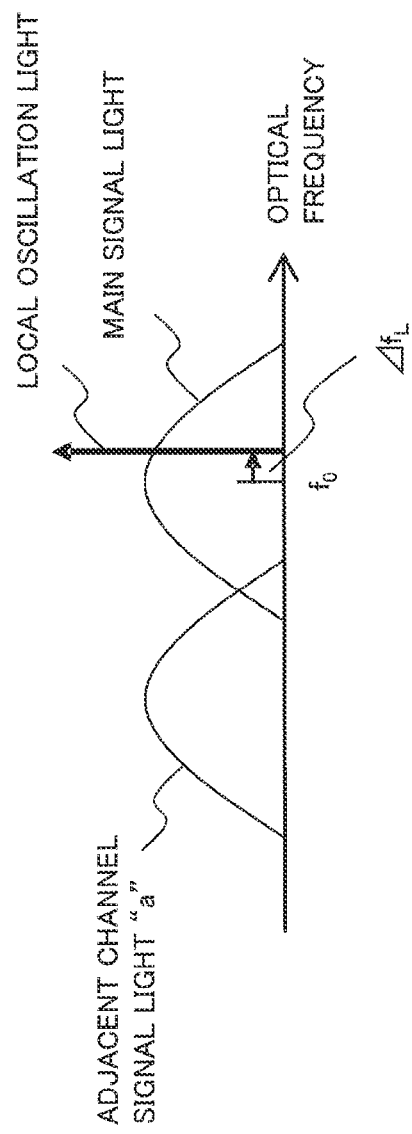
FIG. 6A is a figure showing the location of the local oscillation light with adjacent channel signal light in only one side of the main signal light.
Figure 6B:
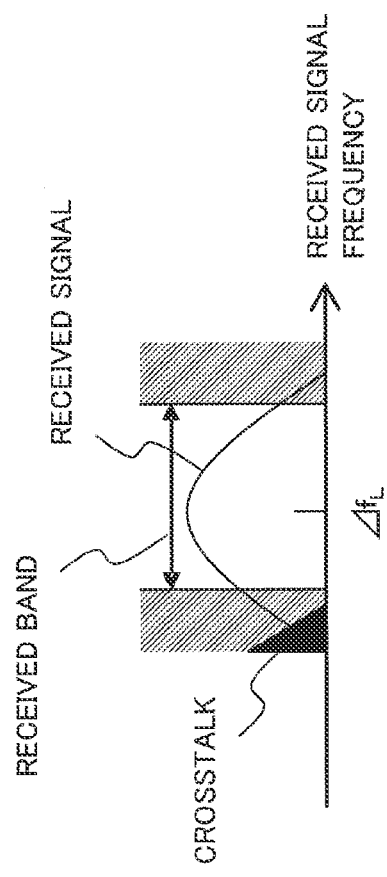
FIG. 6B is a figure showing the frequency spectrum of a received signal with adjacent channel signal light in only one side of the main signal light.

FIG. 6A is a figure showing the location of the local oscillation light with adjacent channel signal light in only one side of the main signal light. FIG. 6B is a figure showing the frequency spectrum of a received signal with adjacent channel signal light in only one side of the main signal light.

The frequency control circuit 106, which has recognized such a state on the basis of the channel information given from the outside, performs the frequency offset control in which the frequency of the local oscillation light is shifted by $\Delta f_L$ in the direction toward the adjacent channel on the side without adjacent channel signal light. That is to say, the frequency control circuit 106 instructs the local oscillation light source 105 on the frequency offset value to be shifted, and causes it to change the frequency of local oscillation light.

Thus, by shifting the frequency of the local oscillation light by $\Delta f_L$, as shown in FIG. 6B, the center frequency of the frequency spectrum of the received signal becomes equal to $\Delta f_L$. Therefore, the peripheral part where the frequency spectrum of the adjacent channel signal overlaps becomes the outside of the received band of the main signal of the coherent optical receiver 100. As a result, the influence of crosstalk due to the adjacent channel signal becomes small.

The range of the frequency offset value of the local oscillation light which the frequency control circuit 106 shifts is set as follows.

If the frequency accuracy of the local oscillation light is equal to $\pm \Delta fe$, and the tolerance in frequency offset compensation processing of the local oscillation light which the digital signal processing circuit 104 performs is equal to $\pm f_{off}$, $\Delta f_L$ is set in the range of $\Delta f_L < \Delta f_{off} - \Delta fe$.

Figure 7A:
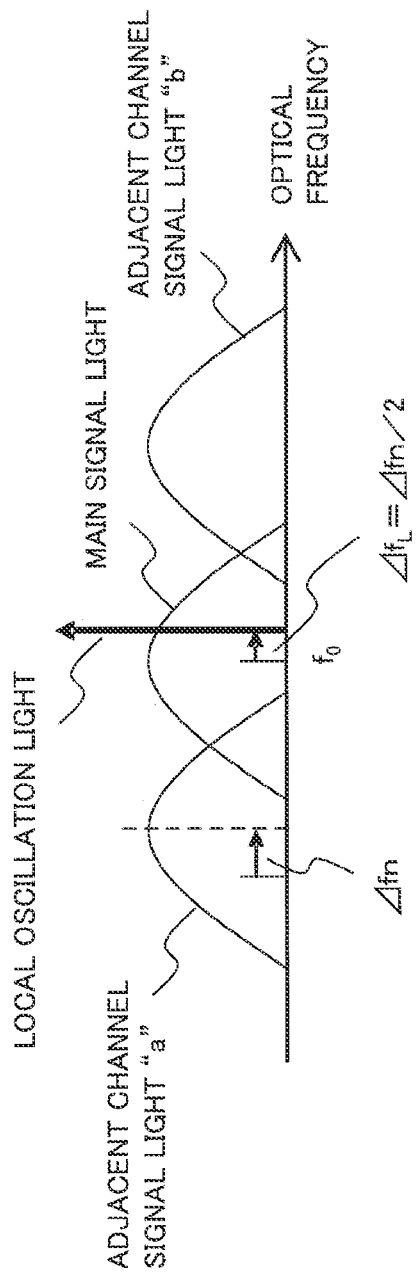
FIG. 7A is a figure showing the location of the local oscillation light with adjacent channel signal light in both sides of the main signal light and the frequency of adjacent channel signal light in either one side shifted from a predetermined position.
Figure 7B:
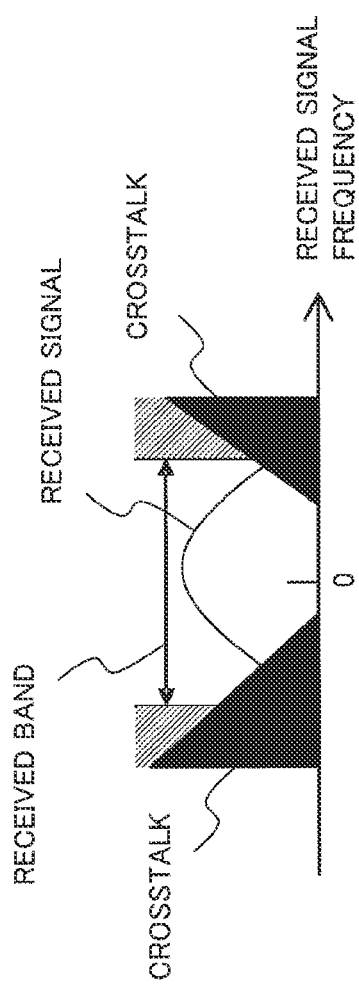
FIG. 7B is a figure showing the frequency spectrum of a received signal with adjacent channel signal in both sides of the main signal light and the frequency of adjacent channel signal light in either one side shifted from a predetermined position.

FIG. 7A is a figure showing the location of the local oscillation light with adjacent channel signal light in both sides of the main signal light and the frequency of adjacent channel signal light in either one side shifted from a predetermined position. FIG. 7B is a figure showing the frequency spectrum of a received signal in such case.

Thus, even though there is adjacent channel signal light in both sides of the main signal light, the frequency control circuit 106 performs the frequency offset control of shifting the frequency of the local oscillation light if the frequency of adjacent channel signal light in either one side is shifted from the predetermined position. It is supposed that the information on the frequency shift from the predetermined position is also included in the channel information given to the frequency control circuit 106 from the outside.

FIGS. 7A and 7B show a case in which the frequency of the adjacent channel signal light "a" shifts in the direction approaching the received band of the main signal channel. If the frequency of the adjacent channel signal light "a" shifts by $\Delta fn$, the frequency control circuit 106 performs the frequency offset control so that it may shift the frequency of the local oscillation light by $\Delta fn/2$ toward the direction of the adjacent channel signal light "b". By this means, it becomes possible to minimize the frequency spectrum components of the adjacent channel signal light "a" and the adjacent channel signal light "b" which mix into the received band of the main signal of the coherent optical receiver 100.

Although not shown in the figure, if the frequency of the adjacent channel signal light "a" shifts in the direction away from the received band of the main signal channel, the frequency offset control is performed which shifts the frequency of the local oscillation light in the direction of the adjacent channel signal light "a".

FIG. 8 is a flowchart illustrating the operation of the frequency control circuit 106 of the coherent optical receiver 100 in accordance with the second exemplary embodiment.

The frequency control circuit 106 receives the channel information given from the outside (S201).

The presence or absence of signal light in the adjacent channel is determined on the basis of the received channel information (S202).

If there is no adjacent channel signal light in both sides neighboring the main signal light (branch 1), the instruction of frequency change in the local oscillation light to the local oscillation light source 105 is not performed (S203). This is the case shown in FIGS. 4A and 4B mentioned above.

If there is the adjacent channel signal light in one side (branch 2), the instruction to shift the frequency of the local oscillation light in the direction toward the adjacent channel on the side without adjacent channel signal light is outputted to the local oscillation light source 105 (S204). This is the case shown in FIGS. 6A and 6B mentioned above.

If there is the adjacent channel signal light in both sides of the main signal light (branch 3), it is confirmed in which side of the adjacent channel signal light there is a frequency shift (S205). If there is no frequency shift in both adjacent channel signal light (S205/NO), the instruction to shift the frequency of the local oscillation light is not performed to the local oscillation light source 105 (S203). This is the case shown in FIGS. 5A and 5B mentioned above.

On the other hand, if there is a frequency shift in either adjacent channel signal light among the adjacent channel signal light on both sides (S205/YES), the instruction to shift the frequency of the local oscillation light depending on the situation of the frequency shift is outputted to the local oscillation light source 105 (S206). For example, if the frequency of either adjacent channel signal light shifts in the direction approaching the received band of the main signal channel, the instruction to shift the frequency of the local oscillation light in the opposite direction of the adjacent channel signal light whose frequency is shifted is outputted to the local oscillation light source 105. This is the case shown in FIGS. 7A and 7B mentioned above. Also, if the frequency of either adjacent channel signal light shifts in the direction away from the received band of the main signal channel, the instruction to shift the frequency of the local oscillation light in the direction of the adjacent channel signal light whose frequency is shifted is outputted to the local oscillation light source 105.

FIG. 9 is a block diagram showing an example of a configuration for providing channel information from the outside for the frequency control circuit 106 of the coherent optical receiver 100.

A transmitting side node 20 is provided with a plurality of optical transmitters 200, densely multiplexes each signal light to which a signal is applied by an optical multiplexer 210, and transmits to an optical fiber transmission line. A receiving side node 10 is provided with a plurality of coherent optical receivers 100, demultiplexes the densely multiplexed signal light by an optical demultiplexer 110, and receives in each coherent optical receiver 100. The densely multiplexed signal light received through the transmission line is split by an optical splitter 120 and is inputted into the optical demultiplexer 130. The signal light in each channel demultiplexed by the optical demultiplexer 130 is determined whether it is present in a signal detecting part 140 including a photoelectric conversion element. The presence or absence of the signal light in each channel is provided for each coherent optical receiver 100 as information on the channel adjacent to each main signal channel.

As described above, in the second exemplary embodiment, the presence or absence of other signal light in the channel adjacent to the main signal channel is determined on the basis of the channel information given from the outside, and the control to shift the frequency of the local oscillation light is performed depending on the situation. Therefore, it is possible to change the received band of the main signal in the coherent optical receiver so that the peripheral part where the frequency spectrum overlaps with the adjacent channel signal may become the outside of the received band. Even if it is not possible to completely exclude the mixing frequency spectrum component of the adjacent channel signal from the received band, it is possible to change the received band so as to minimize its influence. As a result, the coherent optical receiver according to the second exemplary embodiment is able to reduce the adjacent channel crosstalk that the signal band of the adjacent channel is mixed into the band of the main signal channel, which will become a problem with narrowing of a frequency interval due to increasing the density of transmission lines.

Although it is described that the coherent optical receiver of the second exemplary embodiment has a configuration in which the channel information is given from the outside, it is also possible to have a configuration in which the information is determined inside the coherent optical receiver. For example, if the dispositions of the channels among nodes are determined in advance, it is also possible to set a frequency offset in advance for each coherent optical receiver disposed in the receiving side node on the basis of the channel dispositions. A configuration is also available in which a frequency offset is controlled by detecting the crosstalk quantity or the receiving sensitivity and the like from a received signal outputted from an optical receiver in the coherent receiver, or from an arbitrary signal such as an inside signal of the digital signal processing circuit or an outputted transmission signal, and by transmitting it to the frequency control circuit.

In recent years, in order to handle a rapid increase in communications traffic due to the spread of the Internet, increasing the density of transmission lines in the backbone network has been performed by means of a dense wavelength division multiplexing (WDM) technology. However, it has become a problem with narrowing of a frequency interval due to increasing the density of transmission lines that the adjacent channel crosstalk arises which causes the degradation of transmission characteristics by mixing a signal band of the adjacent channel into a band of the main signal channel demultiplexed at the receiving side.

However, the technologies disclosed in Japanese Patent Application Laid-Open Publication No. 2008-153863 and Japanese Patent Application Laid-Open Publication No. 07-283793 described in the background art are mainly focusing on increasing a bit rate of signal light, and those publications do not refer to the adjacent channel crosstalk.

An exemplary advantage according to the present invention is that it is possible to reduce the adjacent channel crosstalk that the signal band of the adjacent channel is mixed into the band of the main signal channel, which will become a problem with narrowing of a frequency interval due to increasing the density of transmission lines.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. A coherent optical receiver, comprising:
 a coherent optical receiving part for performing coherent detection by inputting and mixing local oscillation light and main signal light received through a transmission line densified by means of a wavelength division multiplexing with a signal applied at a transmitting side, outputting the signal applied to the main signal light as an electric signal, and regenerating and outputting an original signal on the basis of the electric signal; and
 a local oscillation optical frequency control part for receiving channel information on a transmission line adjacent to the main signal light, and outputting the local oscillation light after changing a frequency of the local oscillation light to a predetermined frequency corresponding to the main signal light depending on the presence or absence of adjacent channel signal light of other signal light in an adjacent channel,
 wherein the local oscillation optical frequency control part performs frequency offset control in which the frequency of the local oscillation light is shifted in the direction toward the adjacent channel on the side without adjacent channel signal light, if there is the adjacent channel signal light in only one side of the main signal light.

2. A coherent optical receiver, comprising:

a coherent optical receiving part for performing coherent detection by inputting and mixing local oscillation light and main signal light received through a transmission line densified by means of a wavelength division multiplexing with a signal applied at a transmitting side, outputting the signal applied to the main signal light as an electric signal, and regenerating and outputting an original signal on the basis of the electric signal; and a local oscillation optical frequency control part for receiving channel information on a transmission line adjacent to the main signal light, and outputting the local oscillation light after changing a frequency of the local oscillation light to a predetermined frequency corresponding to the main signal light depending on the presence or absence of adjacent channel signal light of other signal light in an adjacent channel, wherein the local oscillation optical frequency control part performs frequency offset control in which if there are adjacent channel signal light in both sides of the main signal light and frequency-shift in either adjacent channel signal light, and the frequency of the adjacent channel signal light with the frequency-shift shifts in the direction approaching the channel of the main signal light, the frequency of the local oscillation light with the frequency-shift is shifted in the opposite direction of the adjacent channel signal light with the frequency-shift, and if the frequency of the adjacent channel signal light with the frequency-shift shifts in the direction away from the channel of the main signal light, the frequency of the local oscillation light is shifted in the direction of the adjacent channel signal light with the frequency-shift.

3. An optical receiving method, comprising:

receiving main signal light densified by means of a wavelength division multiplexing with a signal applied at a transmitting side through a transmission line;

receiving channel information on a transmission line adjacent to the main signal light;

outputting local oscillation light after changing a frequency of the local oscillation light to a predetermined frequency corresponding to the main signal light depending on the presence or absence of adjacent channel signal light of other signal light in an adjacent channel;

performing coherent detection by mixing the main signal light with the local oscillation light and outputting the signal applied to the main signal light as an electric signal; and regenerating and outputting an original signal on the basis of the electric signal, wherein, in changing a frequency of the local oscillation light, the frequency of the local oscillation light is shifted in the direction toward the adjacent channel on the side without adjacent channel signal light, if there is the adjacent channel signal light in only one side of the main signal light.

4. An optical receiving method, comprising:

receiving main signal light densified by means of a wavelength division multiplexing with a signal applied at a transmitting side through a transmission line;

receiving channel information on a transmission line adjacent to the main signal light;

outputting local oscillation light after changing a frequency of the local oscillation light to a predetermined frequency corresponding to the main signal light depending on the presence or absence of adjacent channel signal light of other signal light in an adjacent channel;

performing coherent detection by mixing the main signal light with the local oscillation light and outputting the signal applied to the main signal light as an electric signal; and regenerating and outputting an original signal on the basis of the electric signal, wherein, in changing a frequency of the local oscillation light, if there are adjacent channel signal light in both sides of the main signal light and frequency-shift in either adjacent channel signal light, and the frequency of the adjacent channel signal light with the frequency-shift shifts in the direction approaching the channel of the main signal light, the frequency of the local oscillation light with the frequency-shift is shifted in the opposite direction of the adjacent channel signal light with the frequency-shift, and if the frequency of the adjacent channel signal light with the frequency-shift shifts in the direction away from the channel of the main signal light, the frequency of the local oscillation light is shifted in the direction of the adjacent channel signal light with the frequency-shift.

* * * * *